United States Patent
Akiya et al.

(10) Patent No.: US 10,263,861 B2
(45) Date of Patent: Apr. 16, 2019

(54) MULTI-PATH AWARE TRACING AND PROBING FUNCTIONALITY AT SERVICE TOPOLOGY LAYER

(71) Applicant: Cisco Technology, Inc., San Jose, CA (US)

(72) Inventors: Nobushige Akiya, Kanata (CA); Carlos M. Pignataro, Raleigh, NC (US); Nagendra Kumar Nainar, Morrisville, NC (US); Paul Quinn, Wellesley, MA (US); James Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 14/587,981

(22) Filed: Dec. 31, 2014

(65) Prior Publication Data

US 2016/0134481 A1 May 12, 2016

Related U.S. Application Data

(60) Provisional application No. 62/076,682, filed on Nov. 7, 2014.

(51) Int. Cl.
*H04L 12/24* (2006.01)

(52) U.S. Cl.
CPC ...... *H04L 41/5058* (2013.01); *H04L 41/5038* (2013.01)

(58) Field of Classification Search
CPC .................. H04L 41/5058; H04L 41/5038
USPC ................................................ 709/223–226
See application file for complete search history.

(56) References Cited

U.S. PATENT DOCUMENTS

| | | | |
|---|---|---|---|
| 6,681,232 B1 * | 1/2004 | Sistanizadeh | H04L 12/2602 |
| | | | 709/224 |
| 6,738,354 B1 * | 5/2004 | Ashwood Smith | A61N 7/02 |
| | | | 370/248 |
| 8,176,201 B1 * | 5/2012 | Minei | H04L 45/507 |
| | | | 370/231 |

(Continued)

OTHER PUBLICATIONS

Aldrin, S. et al., "Service Function Chaining Operations, Administration, and Maintenance Framework"; draft-aldrin-sfc-oam-framework-00; Internet Engineering Task Force; Internet-Draft; Jul. 2, 2014; pp. 1-11.

(Continued)

*Primary Examiner* — Minh Chau Nguyen
(74) *Attorney, Agent, or Firm* — Campbell Stephenson LLP

(57) ABSTRACT

In one embodiment, a system and method are disclosed for sending a request and receiving a reply. The request contains a network service header including a flow label field and a target index field. The flow label field contains a set of available flow labels. The target index field includes a value indicating a target node. The reply contains information indicating which of the flow labels can be used to route a packet to each of the next hop nodes downstream from the device that sent the reply. This process can be repeated for other nodes on a path, and other paths in a service topology layer. The information determined by this process can be used to perform other necessary functionalities at the service topology layer.

20 Claims, 8 Drawing Sheets

(56) References Cited

U.S. PATENT DOCUMENTS

| | | | | |
|---|---|---|---|---|
| 8,824,274 B1* | 9/2014 | Medved | ............... | H04L 41/12 370/217 |
| 8,891,553 B2* | 11/2014 | Guichard | ............... | H04L 45/04 370/392 |
| 9,686,167 B2* | 6/2017 | Dunbar | ............... | H04L 43/0805 |
| 2002/0156914 A1* | 10/2002 | Lo | ............... | H04L 41/0896 709/238 |
| 2004/0151159 A1* | 8/2004 | Xu | ............... | H04Q 11/0062 370/351 |
| 2005/0236113 A1* | 10/2005 | Tani | ............... | G06Q 10/087 156/558 |
| 2005/0240610 A1* | 10/2005 | Tani | ............... | G06Q 10/10 707/999.101 |
| 2006/0130126 A1 | 6/2006 | Touve | ............... | 726/5 |
| 2007/0053359 A1* | 3/2007 | Wu | ............... | H04J 3/14 370/392 |
| 2009/0067423 A1* | 3/2009 | Visser | ............... | H04L 47/10 370/389 |
| 2009/0077237 A1* | 3/2009 | Brehon | ............... | H04L 12/18 709/226 |
| 2009/0190494 A1* | 7/2009 | De Giovanni | ............... | H04L 45/02 370/254 |
| 2010/0135300 A1 | 6/2010 | Yoon | ............... | 370/392 |
| 2011/0058499 A1* | 3/2011 | Zhang | ............... | H04L 45/00 370/254 |
| 2012/0308225 A1* | 12/2012 | Long | ............... | H04L 45/04 398/13 |
| 2013/0111549 A1 | 5/2013 | Sowatskey | ............... | 726/3 |
| 2014/0177638 A1* | 6/2014 | Bragg | ............... | H04L 45/50 370/395.5 |
| 2015/0003283 A1* | 1/2015 | Previdi | ............... | H04L 41/12 370/254 |

OTHER PUBLICATIONS

Halpern, J., et al., "Service Function Chaining (SFC) Architecture"; draft-merged-sfc-architecutre-02; Network Working Group; Internet-Draft; Intended Status: Standards Track; Aug. 22, 2014; pp. 1-26.

Halpern, J., et al., "Service Function Chaining (SFC) Architecture"; Internet Engineering Task Force (IETF); Request for Comments 7665; Category: Informational; ISSN: 2070-1721; Oct. 2015; pp. 1-32.

Kompella, K., "Detecting Multi-Protocol Label Switched (MPLS) Data Plane Failures"; Network Working Group; Request for Comments: 4379; Updates: 1122; Category: Standards Track; Feb. 2006; pp. 1-50.

Quinn, P. et al.; "Network Service Header"; draft-quinn-sfc-nsh-03.txt; Network Working Group; Internet—Draft; Intended Status: Standards Track; Jul. 3, 2014; pp. 1-27.

Quinn, P. et al., "Network Service Header"; draft-quinn-sfc-nsh-07.txt; Network Working Group; Internet-Draft; Intended Status: Standards Track; Feb. 24, 2015; pp. 1-43.

Quinn, P. et al., "Network Service Header"; draft-quinn-sfc-nsh-01.txt, Network Working Group; Internet-Draft; Intended Status: Standards Track; Jul. 23, 2015; pp. 1-43.

Stites, Steven and Prashanth Patil, "Network Service Header Used to Relay Authenticated Session Information"; U.S. Appl. No. 15/014,724; filed on Feb. 3, 2016; consisting of Specification, Claims, and Abstract (29 pages); and Drawings (9 sheets).

\* cited by examiner

US 10,263,861 B2

MULTI-PATH AWARE TRACING AND PROBING FUNCTIONALITY AT SERVICE TOPOLOGY LAYER

RELATED APPLICATIONS

This application claims the domestic benefit under 35 U.S.C. § 119(e) of U.S. Provisional Patent Application Ser. No. 62/076,682, entitled "Multi-Path Aware Tracing and Probing Functionality at Service Topology Layer," filed Nov. 7, 2014, which is hereby incorporated by reference in its entirety and for all purposes as if completely and fully set forth herein.

BACKGROUND

This disclosure generally relates to the field of networking, and more specifically to the provision of tracing and probing functionality at the service topology layer of a network.

Service functions (SF) can include, e.g., routing packets to/through a particular firewall, load balancing, accounting functions (e.g., compiling statistics or otherwise keeping track of how many packets of a particular type come through the network), performing a network address translation (NAT), and numerous other functions.

DETAILED DESCRIPTION

Overview

Figure 1A:
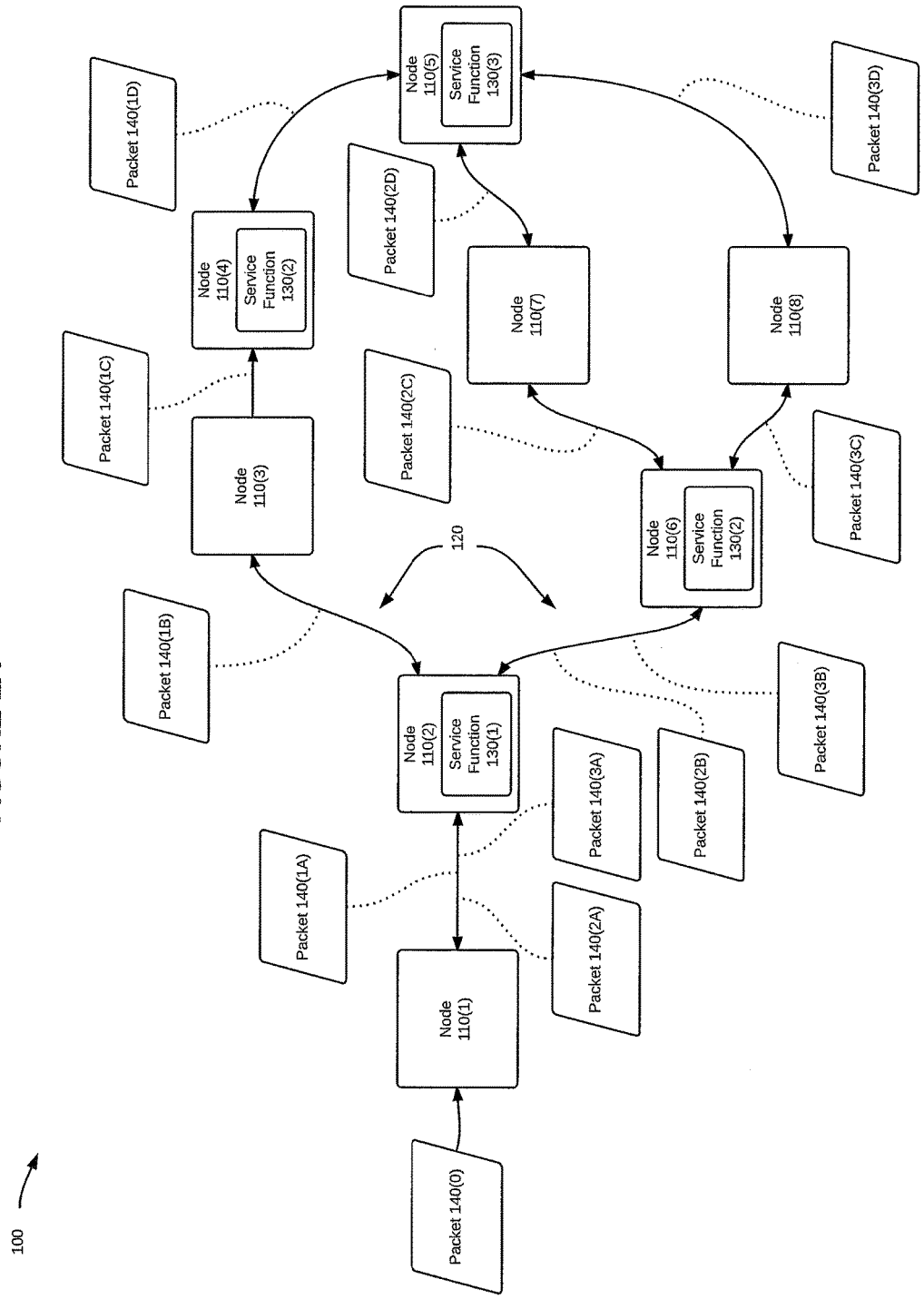
FIG. 1A is a block diagram of a service topology layer of a service function chaining network, including various nodes, indications about service functions, and related items in accordance with one embodiment.

Disclosed herein are various systems and methods for the use of a flow label field and a target index field to discover and maintain the service function chaining paths available on a service topology layer of a network. For example, one embodiment involves sending a request containing a set of available flow labels. One embodiment involves receiving a reply indicating which of the available flow labels can be used to reach each of the next hop nodes on a network path.

Service Function Chaining at the Service Topology Layer

Service function chaining (SFC) describes an ordered set of service functions that are "chained" together. SFC may be implemented via an overlay network such as, e.g., a service topology layer, that can be created on top of an underlying network. An overlay network can be used to allow packets coming into a network to be routed to nodes that can provide a certain set of services throughout the network, wherever those services may be located on the network. The underlying network can be an MPLS (multiprotocol label switching) network, an IP (Internet protocol) network, or any other type of network.

SFC can create an overlay network (e.g., service topology layer) using, in part, a Network Service Header (NSH). A NSH can contain information that can be added to the beginning of each SFC packet, letting the network and network devices/nodes know what services have been requested for that packet, among other things.

When a problem occurs in a traditional computer network, OAM (Operations, Administration and Management) techniques can be used to determine, among other things, where that problem is occurring within the network and what needs to be corrected to fix that problem. Determining the location and cause of the problem can involve sending packets over the network and "tracing" their path to see where the problem or failure is occurring.

Currently, however, the service topology layer does not have any functionality that can be used to determine which nodes or devices can apply which services. Among other reasons for that lack of functionality, the NSH is not currently compatible with the OAM functions that can be employed on a typical network. For instance, the current NSH definition cannot allow OAM Trace (or OAM Traceroute) and OAM Tree Trace techniques to be performed at the service topology layer. This disclosure proposes extensions to the NSH to enable multi-path tracing and probing functionality for the service topology layer, as well as to provide various other benefits and functionalities. The disclosure provided herein provides increased functionality at the service topology layer (or, simply, "service layer") of a network capable of providing service function chaining (SFC) functionality. The service layer is a network layer than can be implemented on top of a multiprotocol label switching (MPLS) network, an Internet protocol (IP) network, or any other appropriate network. Among other aspects, the current disclosure enables certain diagnostic functionality to be performed on the service layer via the creation of an enhanced Network Service Header (NSH).

Flow Labels and Target Index

A Network Service Header (NSH) contains metadata that can be used to facilitate the service function chaining for a packet. The NSH is typically added to the beginning of an SFC packet, and is usually added to a packet by an ingress node or similar device. The metadata in the NSH can be used to describe an ordered set of service functions (i.e., "services") that the associated packet needs to have applied by the service topology layer.

An enhanced NSH, as described in this disclosure and depicted in Table 1, can contain information regarding the service functions that have been requested for a packet, and can be used by other nodes in a network to determine what services need to be applied to that packet without having to modify or inspect the underlying data in the packet. Among other aspects and functionalities, the disclosure provided herein creates such an enhanced NSH through the insertion of a "Flow Label" field and a "Target Index" field. This enhanced NSH is depicted in Table 1, below:

TABLE 1

```
   0                   1                   2                   3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |O|C|R|R|R|R|R|R|    Reserved     |        Protocol Type         |
  +-+-+-+-+-+-+-+-+-+-+-+-+-+-+-+-+-+-+-+-+-+-+-+-+-+-+-+-+-+-+-+-+
  |                Service path                   |  Service index |
  +-+-+-+-+-+-+-+-+-+-+-+-+-+-+-+-+-+-+-+-+-+-+-+-+-+-+-+-+-+-+-+-+
  |                Flow Label                | Reservd | Target Index |
  +-+-+-+-+-+-+-+-+-+-+-+-+-+-+-+-+-+-+-+-+-+-+-+-+-+-+-+-+-+-+-+-+
  |                  Network Platform Context                      |
  +-+-+-+-+-+-+-+-+-+-+-+-+-+-+-+-+-+-+-+-+-+-+-+-+-+-+-+-+-+-+-+-+
  |                   Network Shared Context                       |
  +-+-+-+-+-+-+-+-+-+-+-+-+-+-+-+-+-+-+-+-+-+-+-+-+-+-+-+-+-+-+-+-+
  |                  Service Platform Context                      |
  +-+-+-+-+-+-+-+-+-+-+-+-+-+-+-+-+-+-+-+-+-+-+-+-+-+-+-+-+-+-+-+-+
  |                   Service Shared Context                       |
  +-+-+-+-+-+-+-+-+-+-+-+-+-+-+-+-+-+-+-+-+-+-+-+-+-+-+-+-+-+-+-+-+
```

As shown in Table 1, a NSH can contain a "Service path" field, which is a 20-bit field that can be used to describe a particular SFC. That SFC can describe a list of one or more services to be applied to a packet. This information can then be used by a node, for example, to determine (e.g., such as by querying a database or other data store) what service functions need to be applied to that packet. The "Service Index" field is an 8-bit field that can be used to keep track of which of the service functions have been applied. In one embodiment, the Service Index references the service function that needs to be applied next. In another embodiment, the Service Index references the service function that was most recently applied.

The "Target Index" field is an 8-bit field that can be used to indicate (such as via a pointer, for example) the target service function(s) for which the associated packet is intended. This field can be used to describe a service node hosting a specific service index, as opposed to, e.g., a specific number of "hops" or a specific "time to live" (TTL). An initiator node/device (e.g., ingress node/device) of an operation can set the Target Index to a specific service index value before forwarding the packet over the network. For instance, an ingress node can set the "Target Index" to a value representing the final service function to be applied to a packet, or to a designated service function for use in performing functionality (e.g., trace and tree trace functionality) described elsewhere in this disclosure. The ways in which the Target Index can used will be described in more detail elsewhere in this disclosure.

The "Flow Label" field is a 20-bit field that holds a flow label. As will be discussed in more detail in conjunction with FIGS. 1A-1D, a given network may contain more than one service node that can apply the same service function. Various situations may arise where it is desirable to control to which of those service nodes a packet is routed. Moreover, a given network may contain multiple paths of equal cost that can be used to arrive at each of the service nodes that are capable of applying that service function. The "Flow Label" field may be used to indicate which of those specific paths should be followed, and to which of the eligible service nodes the packet should be sent. As discussed in the examples provided herein, the Flow Label values are chosen to represent the name of the respective nodes 110. In other embodiments, the "Flow Label" can be any arbitrary number, letter, or other value.

The inclusion of these fields provides certain desirable functionality that was previously unavailable at the service topology layer. Among other such functionalities, the approach disclosed herein allows for tracing and probing functionality on the service layer. Moreover, adding these fields eliminates the need for network nodes to inspect the underlying data payload of a packet to determine multi-path information. Service nodes in the service layer can use the Flow Label field to perform various services without having to inspect the underlying data packet, such as load balancing and other service functions. (Network nodes/devices between the service nodes can continue to load balance however they desire.) Information in the NSH can also be used to influence a packet through a network on the service layer, such as the network described below.

FIG. 1A is a block diagram of a service topology layer of a network 100 that is configured to apply the increased functionality made possible by the enhanced NSH described herein. More specifically, FIG. 1A depicts a group of nodes 110 connected via a network 120, in accordance with one embodiment. In one embodiment, one node can be an ingress node/device, and one node can be an egress node/device. Each of the intermediate nodes can be (but does not have to be) a service node. Moreover, an ingress node and/or an egress node may also be a service node. In the embodiment depicted in FIG. 1A, node 110(1) is an ingress node, and node 110(5) is both an egress node and a service node (i.e., node 110(5) is capable of applying SF3). Nodes 110(2)-110(4) and Nodes 110(6)-110(8) can each be an intermediate service node (SN), and nodes 110(2), 110(4), and 110(6) are also service nodes (along with egress/service node 110(5)). Although one example network configuration is provided herein, many other network configurations are possible in accordance with this disclosure. Other network configurations may contain more or less nodes than the example network depicted in FIG. 1A.

As also depicted in FIG. 1A, certain nodes in a service topology layer have the ability to apply a service function, such as service function(s) 130. As shown in FIG. 1A, for example, node 110(2) is capable of applying a first service function ("SF1") 130(1), node 110(4) and node 110(6) are both capable of applying a second service function ("SF2") 130(2), and node 110(5) is capable of applying a third service function ("SF3") 130(3). Although discussed generically herein, service functions (SF) can include, e.g., routing packets to/through a particular firewall, load balancing, accounting functions (e.g., compiling statistics or otherwise keeping track of how many packets of a particular type come through the network), performing a network address translation (NAT), and numerous other functions. In other embodiments, many other service functions are possible. Moreover, none of the service functions discussed herein need to be present in any given embodiment, although each embodiment should contain at least one or more service functions (even if those service functions are distinct from the service functions described herein).

A service topology layer can be configured to provide one or more service functions to a packet. In one embodiment, an inbound packet may be classified upon arrival at an ingress node. A packet may be classified based on various information, such as, e.g., policy information and/or profile information pertaining to the customer and/or to the external network that sent the packet to the service topology network. An ordered group of service functions, referred to herein as a "service function chain" (SFC), can be applied to each packet based upon its classification. In the embodiment depicted in FIG. 1A, incoming packet 140(0) is classified upon arriving at ingress node 110(1). Upon determining the classification of an incoming packet 140(0), node 110(1) may determine that service functions SF1, SF2 and SF3 should be applied to packet 140. Although service functions SF1, SF2 and SF3 are discussed in generic terms herein, in practice these service functions may be any type of service functions, including, but not limited to, the specific service functions enumerated herein.

A node, such as ingress node 110(1), can use the information contained in the service function chain to set the appropriate values in a network service header. In one embodiment, a node may use the information in the SFC to set the values for a Target Index field and a Flow Label field in a network service header (NSH). For instance, as in view of FIG. 1A, various examples of those values can be seen in network service headers 190, in packet 140, as depicted in FIGS. 1B-1D.

Figure 1B:
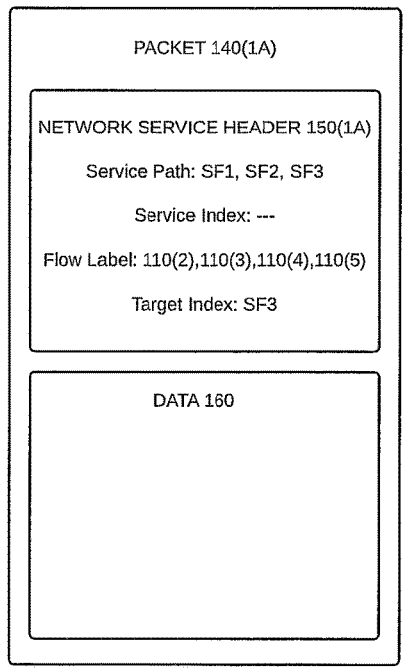
FIG. 1B is a block diagram showing additional details of packet(s) at various points in a first service function chaining path through a service topology layer, in accordance with one embodiment.
Figure 1B:
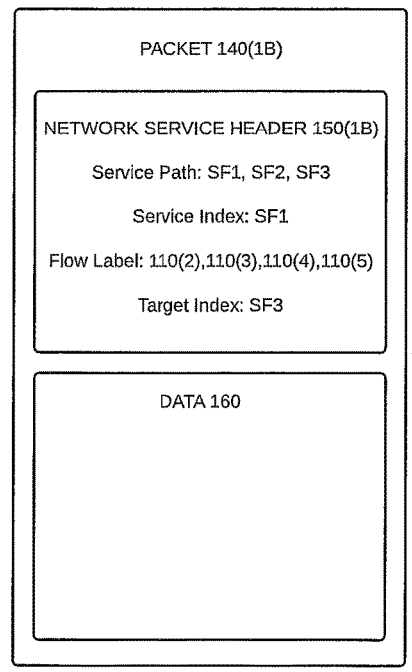
Figure 1B:
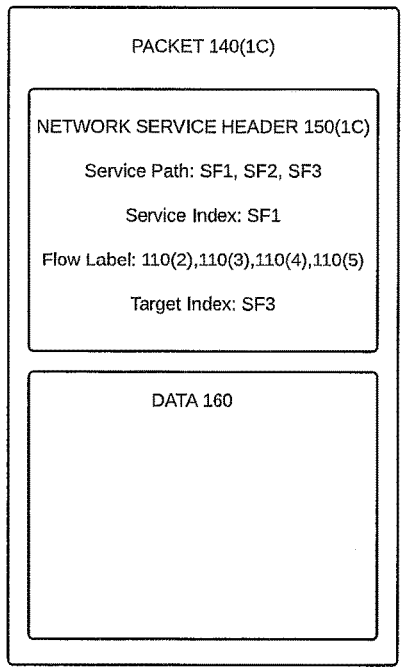
Figure 1B:
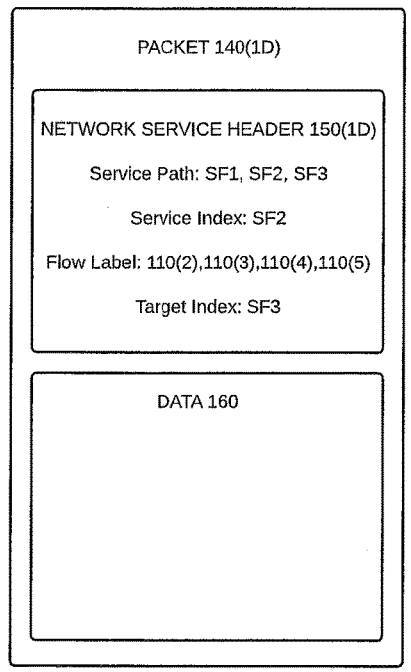
Figure 1C:
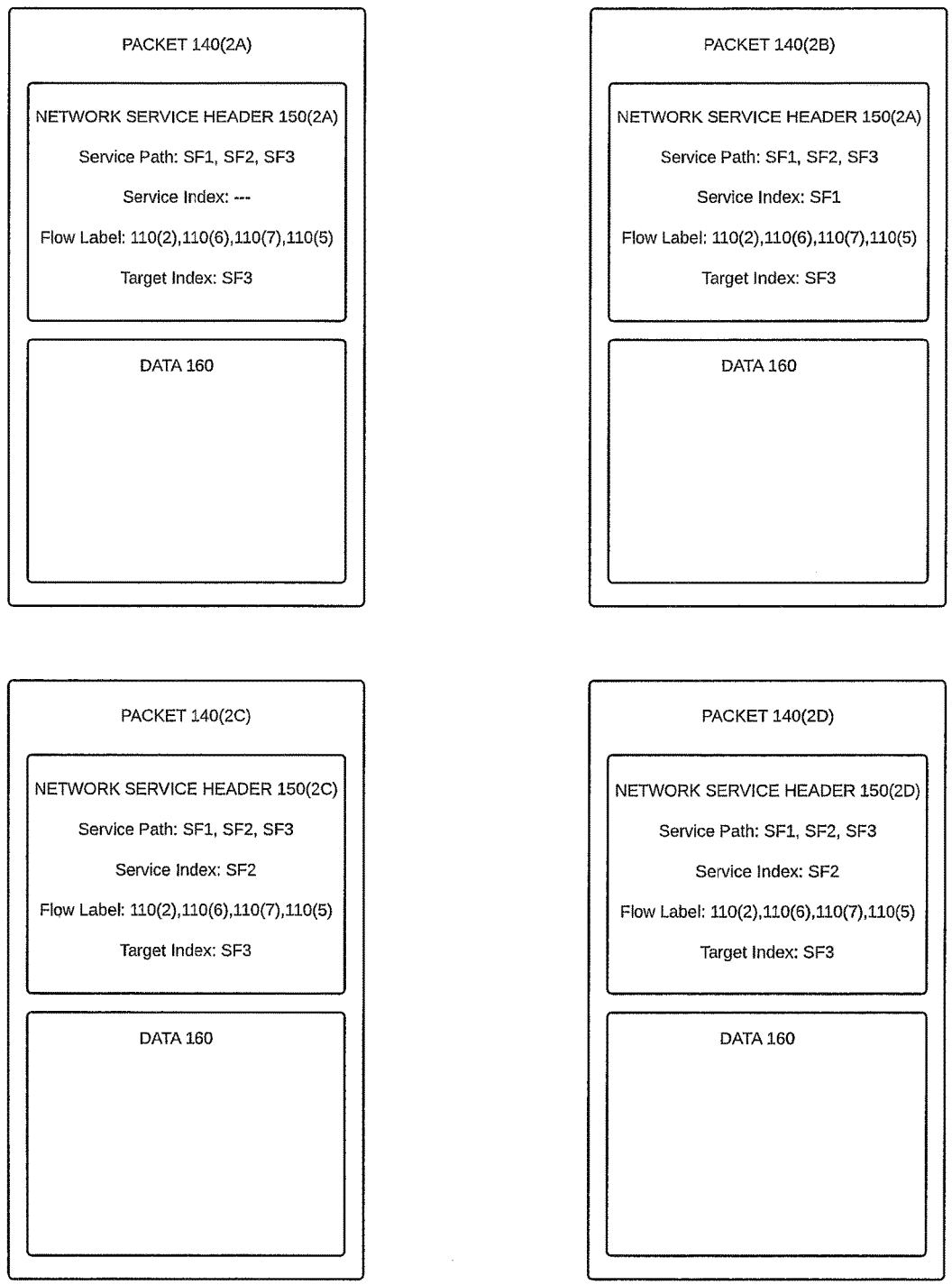
FIG. 1C is a block diagram showing additional details of packet(s) at various points in a second service function chaining path through a service topology layer, in accordance with one embodiment.
Figure 1D:
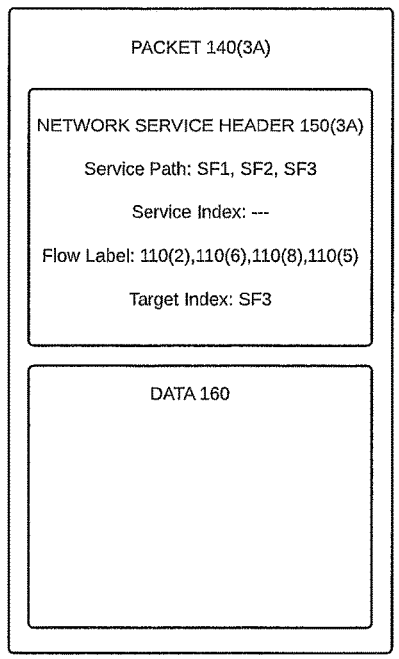
FIG. 1D is a block diagram showing additional details of packet(s) at various points in a third service function chaining path through a service topology layer, in accordance with one embodiment.
Figure 1D:
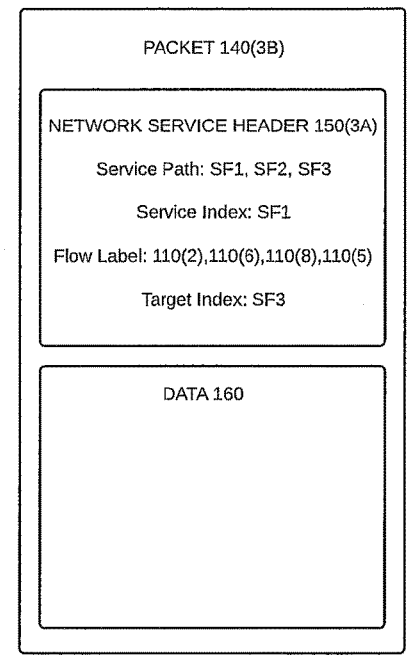
Figure 1D:
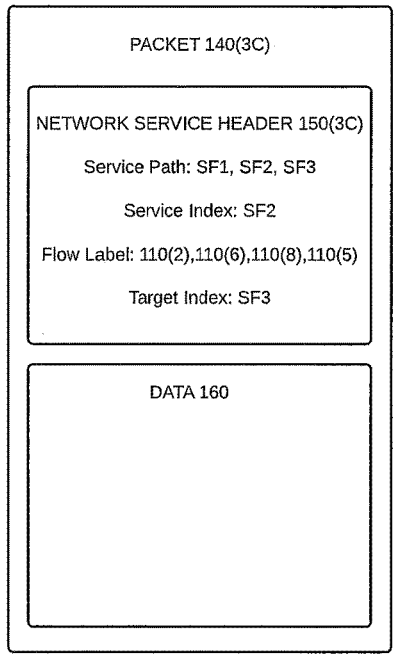
Figure 1D:
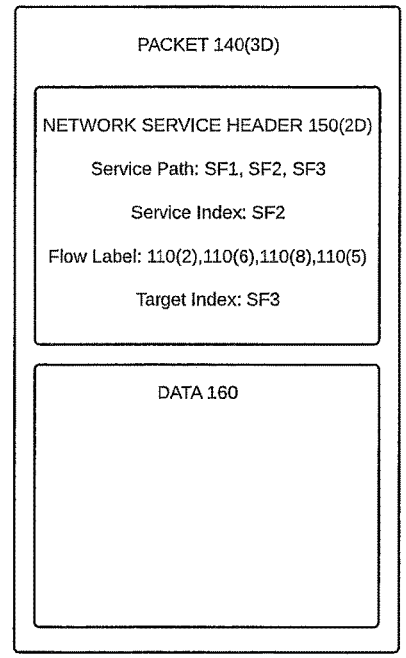

As can be seen from FIGS. 1B-1D, the SFC associated with packet 140 includes SF1, SF2 and SF3. There are three potential paths of "equal cost" that can apply this ordered set of service functions, starting from ingress node 110(1). The first of those paths, as depicted by the packets and network service headers shown in FIG. 1B, starts by applying SF1 at node 110(2) and proceeds through node 110(3), followed by the application of SF2 at node 110(4), and concluding with the application of SF3 at node 110(5). The second of those paths, as depicted by the packets and network service headers in FIG. 1C, starts by applying SF1 at node 110(2), proceeds to node 110(6) for the application of SF2, and then proceeds through node 110(7) to node 110(5) for the application of SF3. The third of these paths, as depicted by the packets and network service headers in FIG. 1D, is the same as the second of these paths except that the packet can be routed through node 110(8) instead of through node 110(7).

FIG. 1B provides enhanced detail of packets 140(1A), 140(1B), 140(1C), and 140(1D) (collectively "packet 140 (1)") at various points during one equal-cost path through service layer 100 that can be used to apply SF1, SF2 and SF3. Each of these packets has an associated NSH (e.g., NSH 150(1A)-150(1D), respectively), indicating the value of the Service Path, Service Index, Flow Label and Target Index at various points throughout the packets traversal of service topology layer 100. At each stage of this equal-cost path to apply the SFC of SF1, SF2 and SF3, the service path associated with that SFC is the same: "SF1, SF2, SF3". The Flow Label is also the same at each stage of this equal-cost path, as the Flow Label represents the path itself. That is, the path that this packet will take is the first path described above, i.e., node 110(2) to node 110(3) to node 110(4) and finally to node 110(5). In each case of this example, the Target Index is also the same (e.g., SF3), as each iteration of packet 140(1) is directed at the same ultimate target, e.g., the node capable of performing SF3. However, the service index value is changed when the packet encounters a node that can perform the next service function in the associated SFC. Thus, in packet 140(1A), the service index does not have a substantive value (e.g., the value is null, default, empty, or a similar non-substantive concept) because no service functions have been applied at that point. However, since packet 140(1B) represents the state of the packet after node 110(2) applied SF1, the service index has been incremented at this point to reflect that fact. Packet 140(1C) represents the packet after it has passed through node 110(3), which does not apply any service functions, so the service index has not been re-incremented, but rather continues to reflect the fact that the last service function applied was SF1. Packet 140(1D) represents the packet after it has passed through node 110(4), which applies SF2, so the service index has been incremented to "SF2" to reflect the fact that SF2 was the last service function that was applied to the packet. Although not expressly depicted herein, node 110(5) could increment the service index to "SF3," since node 110(5) is can apply SF3 to the packet. Notably, data 160 has not been changed by this process.

Similarly, FIG. 1C provides enhanced detail of packets 140(2A), 140(2B), 140(2C), and 140(2D) (collectively "packet 140(2)") at various points during one equal-cost path through service layer 100 that can be used to apply SF1, SF2 and SF3. Each of these packets has an associated NSH (e.g., NSH 150(2A)-150(2D), respectively), indicating the value of the Service Path, Service Index, Flow Label and Target Index at various points throughout the packets traversal of service topology layer 100. At each stage of this equal-cost path to apply the SFC of SF1, SF2 and SF3, the service path associated with that SFC is the same: "SF1, SF2, SF3". The Flow Label is also the same at each stage of this equal-cost path, as the Flow Label represents the path itself. That is, the path that this packet will take is the second path described above, i.e., node 110(2) to node 110(6) to node 110(7) and finally to node 110(5). In each case of this example, the Target Index is also the same (e.g., SF3), as each iteration of packet 140(2) is directed at the same ultimate target, e.g., the node capable of performing SF3. However, the service index value is changed when the packet encounters a node that can perform the next service function in the associated SFC. Thus, in packet 140(2A), the service index does not have a substantive value (e.g., the value is null, default, empty, or a similar non-substantive concept) because no service functions have been applied at that point. However, since packet 140(2B) represents the state of the packet after node 110(2) applied SF1, the service index has been incremented at this point to reflect that fact. The service index has been incremented again in packet 140(2C), as this version represents the packet after it has passed through node 110(6), which applies SF2. Packet 140(2D) represents the packet after it has passed through node 110(7), which does not apply any service functions, so the service index has not been re-incremented, but rather continues to reflect the fact that the last service function applied was SF2. Although not expressly depicted herein, node 110(5) could increment the service index to "SF3," since node 110(5) is can apply SF3 to the packet. As was the case above, data 160 has not been changed by this process.

Also similarly, FIG. 1D provides enhanced detail of packets 140(3A), 140(3B), 140(3C), and 140(3D) (collectively "packet 140(3)") at various points during one equal-cost path through service layer 100 that can be used to apply SF1, SF2 and SF3. Each of these packets has an associated NSH (e.g., NSH 150(3A)-150(3D), respectively), indicating the value of the Service Path, Service Index, Flow Label and Target Index at various points throughout the packets traversal of service topology layer 100. At each stage of this equal-cost path to apply the SFC of SF1, SF2 and SF3, the service path associated with that SFC is the same: "SF1, SF2, SF3". The Flow Label is also the same at each stage of this equal-cost path, as the Flow Label represents the path itself. That is, the path that this packet will take is the second path described above, i.e., node 110(2) to node 110(6) to node 110(8) and finally to node 110(5). In each case of this example, the Target Index is also the same (e.g., SF3), as each iteration of packet 140(3) is directed at the same ultimate target, e.g., the node capable of performing SF3. However, the service index value is changed when the packet encounters a node that can perform the next service function in the associated SFC. Thus, in packet 140(3A), the service index does not have a substantive value (e.g., the value is null, default, empty, or a similar non-substantive concept) because no service functions have been applied at that point. However, since packet 140(3B) represents the state of the packet after node 110(2) applied SF1, the service index has been incremented at this point to reflect that fact. The service index has been incremented again in packet 140(3C), as this version represents the packet after it has passed through node 110(6), which applies SF2. Packet 140(3D) represents the packet after it has passed through node 110(8), which does not apply any service functions, so the service index has not been re-incremented, but rather continues to reflect the fact that the last service function applied was SF2. Although not expressly depicted herein, node 110(5) could increment the service index to "SF3," since node 110(5) is can apply SF3 to the packet. As was the case above, data 160 has not been changed by this process.

Among other functionality provided by this disclosure, an ingress node (e.g., ingress node 110(1)) can use the Target Index and Flow Label fields to discover the topology of the service layer. Upon completion of the process described in conjunction with FIGS. 2 and 3, the ingress node (e.g., ingress node 110(1)) should have discovered the set of Flow Labels that can be used to direct a packet to each of the other nodes in the service topology layer, as well as information indicating which of those nodes can apply which service functions, and which of those nodes is an egress node for the service topology layer. Those advantages, and others, will be explained in more detail in conjunction with the discussion of the Figures and other information provided below.

Figure 2:
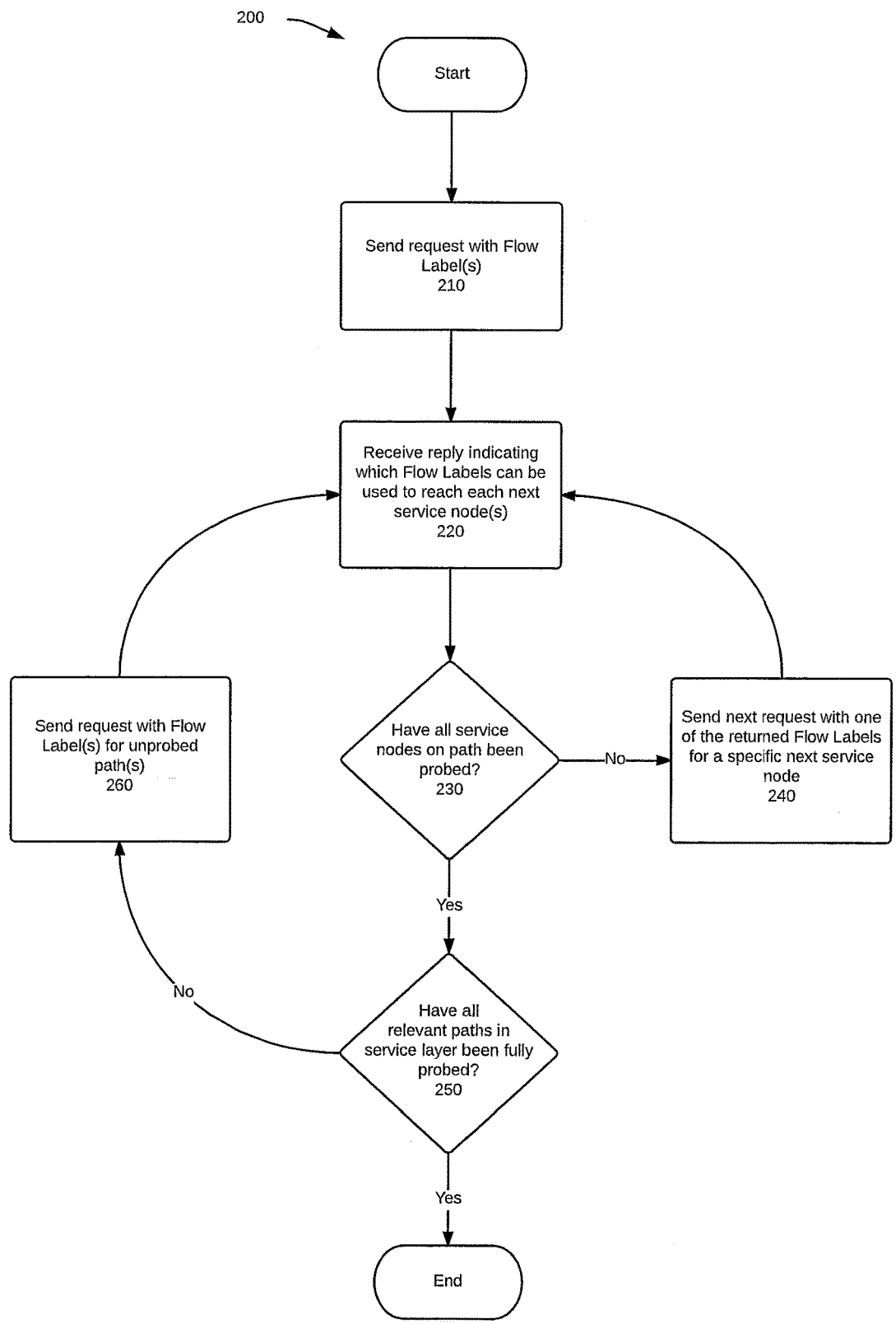
FIG. 2 is a flowchart that illustrates actions that can be performed by a node to probe service nodes in a service topology layer, and determine various information related to paths and equal-cost paths through a service topology layer in accordance with one embodiment, particularly as understood from the perspective of a requesting or ingress node.

FIG. 2 is a flowchart of method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 200, which is described with reference to the example elements shown in FIGS. 1A-1D, shows a procedure that can be performed by a node in accordance with this disclosure. More specifically, method 200 depicts one aspect of the tracing and probing functionality for a node of an SFC to discover and traverse each equal-cost multi-path ("ECMP") routing path on the service topology layer for a given SFC. In one embodiment, method 200 can be performed by an ingress node, such as node 110(1).

Method 200 can begin at 210, where a node uses a flow label to send a request to a service node. In one embodiment, the request may be in the form of a packet containing an NSH in accordance with this disclosure. Included in this request can be a flow label that is known to direct a packet to the intermediary node that the sending node is attempting to reach. In one embodiment, the requesting node may use the target index to control the node along a given flow path for which the packet is intended, particularly where the request is targeted for a node along a path that is not the last node along that path. Also included in this request can be a set of available and unassigned flow labels, among other information.

For instance, ingress node 110(1) can send a packet 140 to service node 110(2), where that packet includes a set of available flow labels. As one example, the ingress node may have the following set of flow labels available: {16, 17, 18, 19, 20, 21, 22, 23}. Having already determined that any of these flow labels can be used to reach service node 110(2), ingress node 110(1) may, in one embodiment, choose to use a flow label of "23" to direct the packet to the intended service node, service node 110(2). In one embodiment, the requesting node may set the value of the target index to indicate the service node for which the request is intended. For example, and as will be explained in more detail below, flow label "23" may be used to reach any of the nodes along the "third path" (e.g., service node 110(2)→service node 110(6)→service node 110(8)→egress/service node 110(5)). Therefore, in one example the target index can be set to a value indicating that service node 110(2) is the target node for this particular request.

Figure 3:
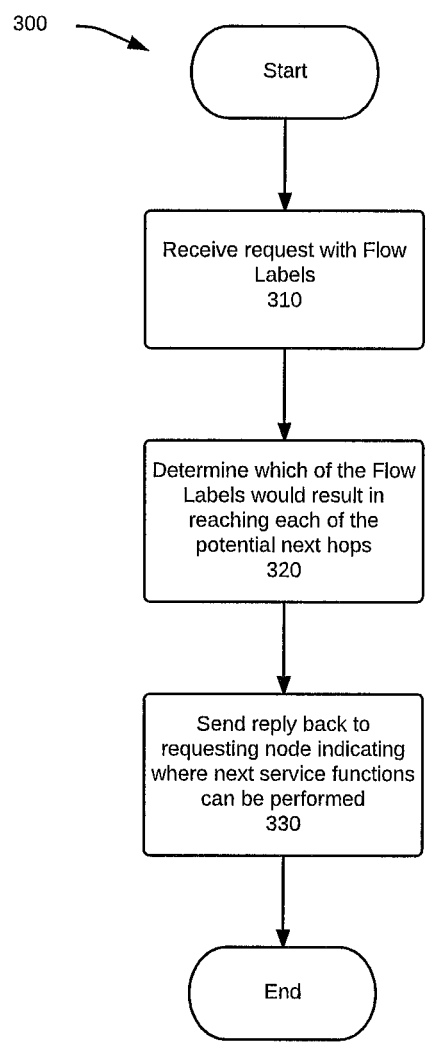
FIG. 3 is a flowchart that illustrates actions that can be performed by a node to provide various information related to nodes that can apply certain service functions, as well as information related to paths and equal-cost paths through a service topology layer in accordance with one embodiment, particularly as understood from the perspective of a receiving or intermediary node.

As will be explained in more detail in the discussion of FIG. 3 and method 300, the receiving node (e.g., service node 110(2)) may send a reply back to the requesting node (e.g., ingress node 110(1)) indicating which of the available flow labels can be used to reach each of the "next hop" nodes that are downstream from the receiving node. The node that made the request in 210 may receive this reply in 220. Thus, in one example, ingress node 110(1) may receive a reply from service node 110(2) indicating that flow labels {16, 17, 20, 22} can be used to direct a packet towards service node 110(4), and further indicating that flow labels {18, 19, 21, 23} can be used to direct a packet towards service node 110(6). These two subsets of flow labels thereby provide ingress node 110(1) with all of the information necessary to reach either of the potential "next hop" service nodes that are downstream from service node 110(2).

Proceeding to 230, the requesting node can determine if all of the available service nodes for a particular path have been probed. Stated somewhat differently, in 230 the requesting node may determine if it has all of the ECMP information that is needed to direct a packet over a given path (including potential sub-paths) on the service topology layer 100. Although multiple paths have not been fully probed, for ease of discussion in this explanation, each of those paths will be discussed seriatim instead of sequentially. In practice, the probing of multiple paths may be ongoing simultaneously or at least partially simultaneously; a node does not need to fully probe one path before it can begin to probe the other paths.

Continuing with the example above, ingress node 110(1) could determine that it does not have all of the necessary information (i.e., may determine that all of the service nodes and sub-paths have not been probed) for a selected one of those paths. For instance, while ingress node 110(1) has already received the information necessary to reach both of the service nodes that can apply SF2 (e.g., service node 110(4) and service node 110(6)), ingress node 110(1) has not yet received the information necessary to determine the network topology of the nodes that are downstream from those service nodes.

The requesting node can proceed to 240 for a selected one of those paths, at which point the requesting node can use the flow label information received in 220 to send one or more additional requests to nodes that are further downstream along that path. Continuing with the example being discussed herein, ingress node 110(1) could choose any of the flow labels available for service node 110(4) (e.g., any of flow labels {16, 17, 20, 22}) and use that flow label to send a packet to service node 110(4), via service node 110(2). In one embodiment, ingress node 110(1) can set the target index to indicate that the target of this request is service node 110(4). Ingress node 110(1) can also include information in that request to indicate the flow labels that are available and unassigned flow labels. Ingress node 110(1) can also include information in the request to indicate the flow labels that are available and unassigned. In this example, the request could indicate that flow labels {16, 17, 20, 22} are available for use by nodes on the previously-described "first path."

Returning again to 220, the requesting node may receive a reply from the service node that was probed in the previous step. As was the case with the previous iteration of 220, this reply can indicate which of the available flow labels can be used to reach each of the "next hop" nodes that are downstream from the respective receiving node (e.g., the service node that was probed in the previous step). Continuing with this example, ingress node 110(1) may receive a reply from service node 110(4) indicating that all of the flow labels that were available to service node 110(4) (e.g., flow labels {16, 17, 20, 22}) can also be used to direct a packet towards the next service node on that path (e.g., service node 110(5)). In this particular instance, there would not have been a need to further divide this subset of flow labels because there is only one service node downstream from service node 110(4), and only one path from service node 110(4) to service node 110(5).

Continuing again to 230, the requesting node (e.g., ingress node 110(1)) should determine that all of the service nodes on the "first path" still have not been probed. Thus, the requesting node should repeat 240 for that path, sending another request along the "first path." This request should contain the same set of available and unassigned flow labels that were sent to service node 110(4). However, the flow label used to direct the request and/or the target index of the packet may be changed to indicate that this particular request is targeted for service node 110(5). Returning again to 220, the requesting node should receive a reply from service node 110(5) indicating that all of the "offered" flow labels can be used to reach the next hop, which would be the end of the service topology layer 100.

At this point, the requesting node (e.g., ingress node 110(1)) should determine in 230 that all service nodes on that particular path have been reached. Method 200 should then proceed to 250 to determine whether any other paths still need to be probed. In the example being discussed herein, ingress node 110(1) should determine in 250 that the "lower path" through service node 110(6), including any sub-paths thereof, still needs to be probed.

Thus, returning focus to the initial reply received from node 110(2), method 200 may proceed with a focus on the flow labels pertaining to service node 110(6). As mentioned above, the initial reply from node 110(2) may have indicated that flow labels {18, 19, 21, 23} can be used to direct a packet towards service node 110(6). Proceeding with this example, ingress node 110(1) should send a request 260 to service node 110(6). This request may contain any of the flow labels that were previously provided for this path (e.g., flow labels {18, 19, 21, 23}) and/or a target index value indicating that the target node is service node 110(6). This request may also contain the full list of flow labels (e.g., flow labels {18, 19, 21, 23}) that may be used to traverse this set of paths (e.g., the lower path, as that term is used herein). This request would be routed via service node 110(2) to service node 110(6).

Returning again to 220, the requesting node (e.g., ingress node 110(1)) may receive a reply from service node 110(6). Since there are two paths from service node 110(6) to the next service node (e.g., service/egress node 110(5)), the reply received from service node 110(6) should have further divided the subset of flow labels that were offered, into two further subsets. Thus, in one example embodiment, the reply received from service node 110(6) may indicate that flow labels {18, 1} can be used to reach service node 110(5) via intermediate node 110(7), and that flow labels {21, 23} can be used to reach service node 110(5) via intermediate node 110(8).

Proceeding to 230, the requesting node should determine that all of the service nodes on this "lower path" have not been probed. The requesting node should then select one of the un-probed paths, and send another request along that sub-path in 240. In this example, ingress node 110(1) may choose to probe the path including intermediate node 110(7) by sending a request 240 to intermediate node 110(7). This request may contain any of the flow labels that were previously provided for this sub-path (e.g., flow labels {18, 19}) and/or a target index value indicating that the target node is intermediate node 110(7). This request may also contain the full list of flow labels (e.g., flow labels {18, 19}) that may be used to traverse this sub-path. This request would be routed to intermediate node 110(7) via service node 110(2) and service node 110(6).

Returning again to 220, the requesting node (e.g., ingress node 110(1)) may receive a reply from intermediate node 110(7). Since there is only one path from service node 110(7) to the next service node (e.g., service/egress node 110(5)), the reply received from service node 110(7) should not have further divided the subset of flow labels that were offered to it. Thus, in one example embodiment, the reply received from service node 110(7) may indicate that flow labels {18, 19} can also be used to reach service node 110(5) via intermediate node 110(7).

Continuing again to 230, the requesting node (e.g., ingress node 110(1)) should determine that all of the service nodes on this sub-path still have not been probed. Thus, the requesting node should repeat 240 for this sub-path, sending another request along this sub-path via intermediate node 110(7). This request should contain the same set of available and unassigned flow labels that were sent to service node 110(7). However, the flow label used to direct the request and/or the target index of the packet may be changed to indicate that this particular request is targeted for service node 110(5). Returning again to 220, the requesting node should receive a reply from service node 110(5) indicating that all of the "offered" flow labels can be used to reach the next hop, which would be the end of the service topology layer 100.

At this point, the requesting node (e.g., ingress node 110(1)) should determine in 230 that all service nodes on that particular sub-path have been probed. Method 200 should then proceed to 250 to determine whether any other paths still need to be probed. In the example being discussed herein, ingress node 110(1) should determine in 250 that the sub-path containing intermediate node 110(8) still needs to be probed.

Thus, returning focus to the previous reply received from service node 110(6), method 200 may proceed with a focus on the flow labels pertaining to the path including intermediate node 110(8). Proceeding with this example, ingress node 110(1) should send a request 260 to intermediate node 110(8). This request may contain the sub-set of available and unassigned flow labels that were previously provided for this sub-path (e.g., flow labels {21, 23}) and/or a target index value indicating that the target node is intermediate node 110(8). This request may also contain the full list of flow labels (e.g., flow labels {21, 23}) that may be used to traverse this sub-path. This request would be routed to intermediate node 110(8) via service node 110(2) and service node 110(6).

Returning again to 220, the requesting node (e.g., ingress node 110(1)) may receive a reply from intermediate node 110(8). Since there is only one path from service node 110(8) to the next service node (e.g., service/egress node 110(5)), the reply received from service node 110(8) should not have further divided the subset of flow labels that were offered to it. Thus, in one example embodiment, the reply 220 received from service node 110(8) may indicate that flow labels {21, 23} can also be used to reach service node 110(5) via intermediate node 110(8).

Continuing again to 230, the requesting node (e.g., ingress node 110(1)) should determine that all of the service nodes on this sub-path still have not been probed. Thus, the requesting node should repeat 240 for this sub-path, sending another request along this sub-path via intermediate node 110(8). This request should contain the same set of available and unassigned flow labels that were sent to service node 110(8). However, the flow label used to direct the request and/or the target index of the packet may be changed to indicate that this particular request is targeted for service node 110(5). Returning again to 220, the requesting node should receive a reply from service node 110(5) indicating that all of the "offered" flow labels can be used to reach the next hop, which would be the end of the service topology layer 100.

At this point, the requesting node (e.g., ingress node 110(1)) should determine in 230 that all service nodes on that particular sub-path have been reached. Method 200 should then proceed to 250, where ingress node 110(1) should determine that all available paths and sub-paths in the service layer have been fully probed. Method 200 should end at this point.

Method 300, which is described with reference to the example elements shown in FIGS. 1A-1D, shows a procedure that can be performed by a node in accordance with this disclosure. More specifically, method 300 depicts one aspect of the tracing and probing functionality for a node of an SFC to discover and traverse each equal-cost multi-path ("ECMP") routing path on the service topology layer for a given SFC. In one embodiment, method 300 can be performed by a service node, such as node 110(2).

Method 300 can begin at 310, where a node can receive a request, such as any of the requests sent by another node in conjunction with method 200, supra. In one embodiment, the request may be in the form of a packet containing an NSH in accordance with this disclosure. Included in this request can be a set of available and unassigned flow labels, among other information. For instance, service node 110(2) can receive a packet 140 that includes a set of available flow labels. Continuing with the examples provided above, service node 110(2) can receive a request including the set of available flow labels {16, 17, 18, 19, 20, 21, 22, 23}. As other examples consistent with the example provided above, service nodes 110(4) and 110(5) can receive a request including the set of available flow labels {16, 17, 20, 22}; service node 110(6) can receive a request including the set of available flow labels {18, 19, 21, 23}; service nodes 110(7) and 110(5) can receive a request including the set of available flow labels {18, 19}; and service nodes 110(8) and 110(5) can receive a request including the set of available flow labels {21, 23}. These are just examples provided for ease of facilitating the instant discussion. In practice, many other sets of service labels may be received, and may be received by nodes other than those specifically discussed herein.

Upon receiving a request with a set of available flow labels in 310, a node may use that set of flow labels to determine which of those flow labels can be used to reach each of the "next nodes" that are downstream from the receiving node in 320. In certain embodiments, the nodes may also provide the requesting node with information indicating which "next hop" downstream nodes can apply various service functions. Thus, the first intermediary service node (in this example, service node 110(2), which can perform SF1 itself) can send the requesting node a list of the next service nodes and a subset of Flow Labels that are provided for each of those potential next service nodes. As mentioned above, the receiving node can send this information back to the requesting node via a reply. In one embodiment, the receiving node can send this information back to the requesting node by providing downstream information and hash keys that can be used to traverse each path. Hash keys may be, for example, sets of IP destination addresses.

Continuing with the examples provided above, service node 110(2) can determine that flow labels {16, 17, 20, 22} can be used to reach service node 110(4) via intermediate node 110(3), and can also indicate that service node 110(4) can apply SF2; and that flow labels {18, 19, 21, 23} can be used to reach service node 110(6), which can also apply SF2. Similarly, service nodes 110(4) can determine that flow labels {16, 17, 20, 22} can all be used to reach service/egress node 110(5), which can apply SF3. Service node 110(6) can determine that flow labels {18, 19} can be used to reach service/egress node 110(5) (which can apply SF3) via intermediate node 110(7), and that flow labels {21, 23} can be used to reach service/egress node 110(5) (which can apply SF3) via intermediate node 110(8). These are just examples provided for ease of facilitating the instant discussion. In practice, each of these nodes may make other determinations based on the flow labels received, and such determinations may be made by nodes other than those specifically discussed herein.

Finally, each of these nodes may send a respective reply back to the requesting node in 330. In each of the examples discussed here, the reply would be sent back to the same requesting node, e.g., ingress node 110(1). Although the preferred embodiment uses a single ingress node (such as ingress node 110(1)) to send all of the requests and receive all of the replies (both per method 200), in practice these functions may be split between multiple nodes, and may be performed by hardware or software other than a node.

Upon a node sending a reply in 330, that particular node would be finished with that instance of method 300. However, multiple nodes may perform method 300 either sequentially, alternately, simultaneously, or in any other sort of order.

Figure 4:
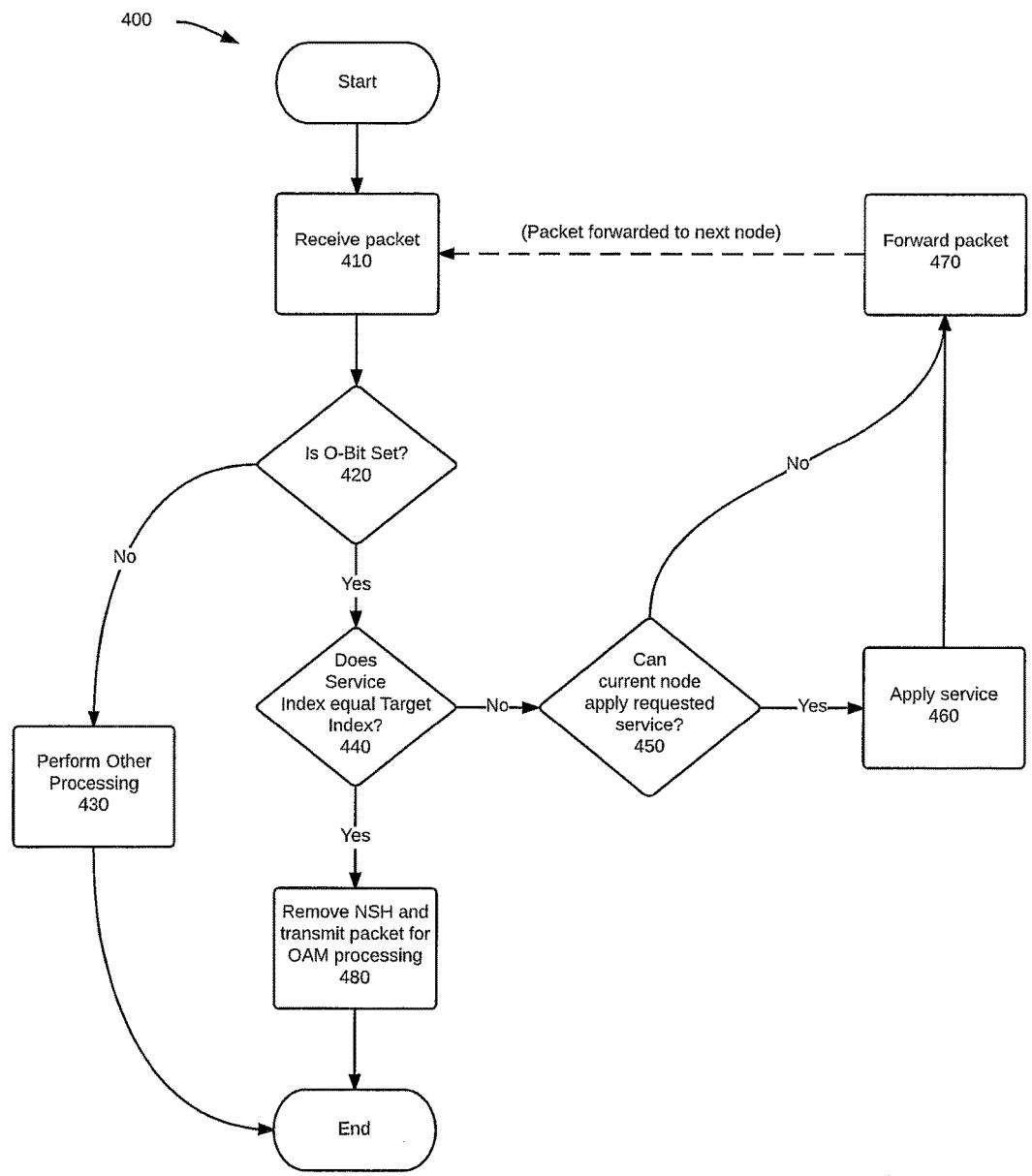
FIG. 4 is a flowchart that illustrates actions that can be performed by nodes in accordance with one embodiment, including the ability to apply a service function chain without having to inspect the data of the underlying packet, pursuant to the disclosure provided herein.

FIG. 4 is a flowchart of method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 400, which is described with reference to the example elements shown in FIGS. 1A-1D, shows a procedure that can be performed by a node upon receiving a packet in accordance with this disclosure. More particularly, method 400 depicts a procedure that can be used to apply all of the service functions in a SFC by using the network service header described herein, but without the need to inspect the underlying data packet in the process. In one embodiment, after discovering the network topology (such as by performing methods 200 and 300, for example), the nodes of the service layer may use the network topology information to route packets to specific service nodes, and via specific paths, by using the Target Index and/or Flow Label fields of the NSH in conjunction with method 400.

For instance, if an ingress device wants to determine where a problem is occurring on the service layer, the ingress device could control the specific path the packet takes through the network by applying a specific Flow Label (e.g., to control a path that the packet takes through the network) and/or a specific Target Index (e.g., to control the node at which the packet stops). Thus, an ingress device can "test" or "ping" another node by using any of the Flow Labels that the ingress node has determined will route the packet to the specific node in question. In one embodiment, after the ingress device determines that one node is functioning properly, the ingress device may then want to determine whether other "downstream" nodes are also working correctly. Such determinations may be made by applying the appropriate Flow Labels and/or Target Index to a packet via a NSH. In certain embodiments, the ingress device can set the Flow Label to a designated "end" value (e.g., 255) to "ping" (e.g., test, determine whether a specific device is working properly) an egress device of the service topology layer. In one embodiment, a hash value may be embedded in the NSH. The disclosed functionality may discover and use a specific hash value in the NSH to traverse ECMP routes at the service layer. All of these functions, and more, can be performed in accordance with the disclosure described herein, including various steps and combinations of steps as depicted in FIG. 4 and discussed herein.

For example, a node can receive a packet in 410 containing an enhanced network service header (NSH) in accordance with this disclosure. As one example, service node 110(2) can receive any of packets 140(1A), 140(2A), or 140(3A) containing network service headers 150(1A), 150 (2A), or 150(3A).

In 420, a node can inspect a packet's NSH to determine whether the "O-Bit" is set in the NSH. In one embodiment, this determination can be made by inspecting the packet to determine if the O-Bit has a value of 1, indicating that the O-Bit is "set"; or to determine if the O-Bit has a value of 0, indicating that the O-Bit is not "set." Although not expressly depicted in the figures contained herein, for purposes of this discussion, the reader should assume that the O-Bit is set (e.g., has a value of 1) in the examples being discussed herein. However, if a node determines in 420 that the O-Bit is not set, that node can perform other processing or take other actions in 430, such as forwarding the packet out of the network. At that point, method 400 would end.

If a node determines that the O-Bit is set in 420, the node can next inspect the NSH to determine whether the service index equals the target index, per 440. For instance, in each of the packet 140 depicted in FIGS. 1B-1D, the service index does not equal the target index because all of the requested service functions have not yet been applied. However, using the example provided herein, once SF3 is applied at service node 110(5), service node 110(5) should then increment (or otherwise update) the service index to indicate that SF3 has been applied. At that point, the service index would equal the target index in each of packets 140 depicted in FIGS. 1B-1D.

If a node determines in 440 that the target index does not equal the service index, that node can then determine in 450 whether it can apply a requested service. If the node determines in 450 that it can apply a requested service, then the node should apply that service in 460 and then forward the packet to the next node in 470. Thus, using the examples provided in this disclosure, service node 110(2) would determine that it could apply SF1 to packets 140(1A), 140(2A), and 140(3A). Service node 110(2) could thus apply SF1, and then use the NSH to forward the packet to the appropriate next node in 470. For example, after applying SF1, service node 110(2) could forward packet 140(1A) to intermediate node 110(3), and forward packets 140(2A) and 140(3A) to service node 110(6). Other nodes can perform similar functionality, both in accordance with the specific example provided herein, as well as in accordance with the many other embodiments and topologies that are consistent with this disclosure.

If the node determines in 450 that it cannot apply a requested service, then the node should forward the packet to the next node in 470, without the node itself applying any services. Upon being forwarded by one node in 470, the next node would receive a packet at 410 and that next node could also perform the steps of method 400. For example, after packet 140(1) was forwarded by service node 110(2) to intermediate node 110(3), intermediate node 110(3) would determine that it cannot apply the next requested service function (e.g., SF2), and would then use the NSH to forward the packet to the next node without applying any service functions. Service node 110(4) would then receive packet 140(1), and that node would perform method 400 starting at 410.

If a node determines in 440 that the target index does equal the service index, the node can remove (or "pop") the NSH from the packet and transmit the packet for OAM processing in 480, after which point method 400 would end. Thus, for example, after applying SF3 to any of packets 140(1), 140(2), or 140(3), service node 110(5) should modify the target index accordingly, and upon determining that the target index is equal to the service index, service/egress node 110(5) can remove the NSH from the packet and transmit the packet out of the network for OAM processing, or whatever other functionality is appropriate. Although the term "equal" is used herein, the term does not necessarily require pure mathematical identity, but rather any indication that the last applied service (per the service index) was the target service (e.g., the last service in a SFC, per the target index). Additionally, although node 110(5) is both the final service node as well as the egress node in the example discussed herein, the egress node may be a node other than the final service node. In such an embodiment, the node that applied the final service could forward the packet to the egress node, and that egress node could then remove the NSH and forward the packet out of the service topology layer network.

In addition to the functionality described with respect to the Figures included herein, the introduction of the "Target Index" and "Flow Label" fields into the NSH allow various other critical functionality to be performed on the service layer. For instance, the introduction of these fields into the NSH enables consistent load balancing at the service layer. Similarly, the introduction of these fields into the NSH enables efficient load balancing at each service node, because the intermediate service nodes (e.g., service nodes other than the ingress and egress nodes) do not have to inspect the underlying content of the data packet, but can rather load balance based solely on the information provided in the Flow Label and/or Target Index fields of the NSH.

As used herein, the terms "service layer" and "service topology layer" are generally interchangeable. Similarly, the terms "device" and "node" are also intended to be interchangeable. Terms such as "transmit" and "forward" are intended to be construed broadly with the context of packet-based networking.

Figure 5:
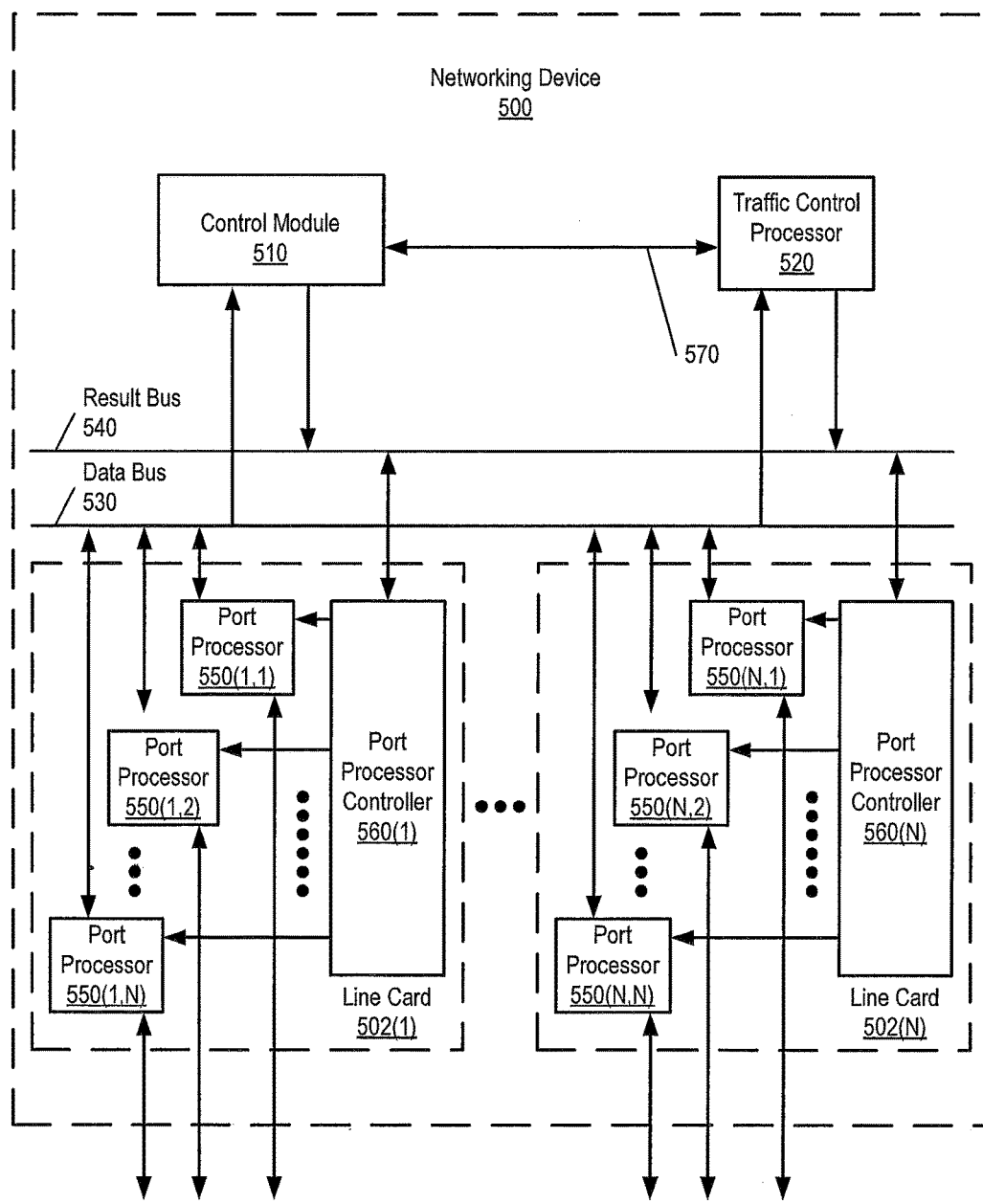
FIG. 5 is a block diagram illustrating components of an example networking device in which the present disclosure can be implemented, according to one embodiment.

FIG. 5 is a block diagram illustrating components of an example networking device 500, which depicts (at least in part) one configuration of a node (e.g., an ingress/egress node, service node, intermediary node, or similar node). In this depiction, networking device 500 includes a number of line cards (line cards 502(1)-502(N)) that are communicatively coupled to a control module 510 (which can include a forwarding engine, not shown) and a traffic control processor 520 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 520 are not only coupled to one another via data bus 530 and result bus 540, but are also communicatively coupled to one another by a communications link 570. It is noted that in alternative embodiments, each line card can include its own forwarding engine.

When a message (e.g., a request, a reply, or any other appropriate message) is received by a node such as networking device 500, the message is identified and analyzed in the following manner. Upon receipt, a message (or some or all of its control information) is sent from one of the port processors 550(1,1)-550(N,N) at which the message was received to one or more of those devices coupled to data bus 530 (e.g., others of port processors 550(1,1)-550(N,N), a forwarding engine, and/or route processor 520). Handling of the message can be performance, for example, by a forwarding engine in accordance with the systems and methods disclosed herein. For example, a forwarding engine may determine that the message should be forwarded to one or more of port processors 550(1,1)-550(N,N). This can be accomplished by indicating to a corresponding one(s) of port processor controllers 560(1)-560(N) that the copy of the message held in the given one(s) of port processors 550(1,1)-550(N,N) should be forwarded to the appropriate one of port processors 550(1,1)-550(N,N).

Networking device 500 can be used, for example, in the implementation of a node (such as nodes 110) in control module 510, or in one or more of port processor controllers 560(1)-560(N) and/or in route processor 520, in order to implement the present disclosure. Although not shown, network device 500 can also be used to implement a routing protocol module and/or network reachability protocol module in control module 510, in one of port processor controllers 560(1)-560(N), and/or in route processor 520 (not shown).

An incoming message (e.g., a request, a reply, or any other appropriate message) can be provided to a node via a forwarding engine or port processor of a line card coupled to a port that received the incoming message. For instance, any of nodes 110 can be configured to process the incoming message. Networking device 500 can be configured to process the incoming message and to generate one or more outgoing messages (e.g., a request), as described throughout this disclosure.

The outgoing message can be provided to a forwarding engine by a node such as nodes 110, which can determine that the outgoing message should be forwarded to one or more of port processors 550(1,1)-550(N,N) that are configured to transmit the outgoing message toward the outgoing message's destination.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims (and also include the scope of the disclosure as defined by claims that will be advanced during prosecution).

What is claimed is:

1. A method comprising:
   sending a set of unassigned flow labels from a first node to a downstream node in a first path, wherein
      the first path comprises a plurality of nodes; and
   receiving at the first node, from the downstream node, information identifying a first subset of the unassigned flow labels, wherein
      the first subset of the unassigned flow labels are associated with a first service node in a first sub-path of the first path, wherein
      the first sub-path comprises one or more service nodes including the first service node, and
      the information further identifies a second subset of the unassigned flow labels that are associated with a second service node in a second sub-path of the first path, wherein
      the second sub-path comprises one or more service nodes including the second service node,
      each service node is configured to apply a service function in a service topology layer, and
      the second subset of the unassigned flow labels does not overlap the first subset of the unassigned flow labels.

2. The method of claim 1, further comprising determining whether at least one service node in the first sub-path has not been probed.

3. The method of claim 2, further comprising in response to determining that at least one service node in the first sub-path has not been probed, sending one or more subsequent requests, wherein
each of the subsequent requests comprises
a subset of the set of unassigned flow labels, and
a next target index indicating a next target node associated with the respective subsequent request.

4. The method of claim 3, further comprising
receiving additional information from the downstream node, wherein
the additional information identifies a third subset of the unassigned flow labels
that are associated with a third service node among the plurality of nodes
in the first path.

5. The method of claim 3, further comprising
determining whether an additional sub-path has not been probed, wherein
the additional sub-path corresponds to an additional set of service nodes configured to apply a service function chain in the service topology layer; and
in response to determining that the additional sub-path has not been probed, sending an additional request, wherein
the additional request comprises an additional subset of unassigned flow labels.

6. The method of claim 1, wherein
the set of unassigned flow labels is sent as part of a request, wherein
the request further comprises
a target index,
the target index indicates a target node associated with the request, and
the target node is a node among the plurality of nodes.

7. The method of claim 6, wherein
the request further comprises
a network service header comprising
a flow label field comprising the set of unassigned flow labels, and
a target index field comprising the first target index.

8. A system comprising:
a network device configured to:
send a set of unassigned flow labels from the network device to a downstream network device in a first path, wherein
the first path comprises a plurality of node network devices; and
receive at the network device, from the downstream network device, information identifying a first subset of the unassigned flow labels, wherein
the first subset of the unassigned flow labels are associated with a first network device configured to apply a service function ("first service node") in a first sub-path of the first path, wherein
the first sub-path comprises one or more service nodes including the first service node, and
the information further identifies a second subset of the unassigned flow labels that are associated with a second service node in a second sub-path of the first path, wherein
the second sub-path comprises one or more service nodes including the second service node,
each service node is configured to apply a service function in a service topology layer, and
the second subset of the unassigned flow labels does not overlap the first subset of the unassigned flow labels.

9. The system of claim 8, wherein the network device is further configured to
determine whether at least one service node in the first sub-path has not been probed.

10. The system of claim 9, wherein the network device is configured to
in response to determining that at least one service node in the first sub-path has not been probed, send one or more subsequent requests, wherein
each of the subsequent requests comprises
a subset of the set of unassigned flow labels, and
a next target index indicating a next target network device associated with the respective subsequent request.

11. The system of claim 10, wherein the network device is configured to
receive additional information from the downstream network device, wherein
the additional information identifies a third subset of the unassigned flow labels that are associated with a third service node among the plurality of network devices in the first path.

12. The system of claim 10, wherein the network device is configured to
determine whether an additional sub-path has not been probed, wherein
the additional sub-path corresponds to an additional set of service nodes configured to apply a service function chain in the service topology layer; and
in response to determining that the additional sub-path has not been probed, send an additional request, wherein
the additional request comprises an additional subset of unassigned flow labels.

13. The system of claim 8, wherein
the set of unassigned flow labels is sent as part of a request, wherein the request further comprises
a target index, the target index indicates a target network device associated with the request, and
the target network device is a network device among the plurality of network devices.

14. The system of claim 13, wherein
the request further comprises
a network service header comprising
a flow label field comprising the set of unassigned flow labels, and
a target index field comprising the first target index.

15. A computer program product comprising:
a plurality of instructions, comprising
a first set of instructions configured to
send a set of unassigned flow labels from a first node to a downstream node in a first path, wherein
the first path comprises a plurality of nodes;
a second set of instructions configured to
receive at the first node, from the downstream node, information identifying a first subset of the unassigned flow labels, wherein
the first subset of the unassigned flow labels are associated with a first service node in a first sub-path of the first path, wherein
the first sub-path comprises one or more service nodes including the first service node, and the information further identifies a second subset of the unassigned flow labels that are associated with a second service node in a second sub-path of the first path, wherein the second sub-path comprises one or more service nodes including the second service node, each service node is configured to apply a service function in a service topology layer, and the second subset of the unassigned flow labels does not overlap the first subset of the unassigned flow labels; and a non-transitory computer-readable storage medium, wherein the instructions are encoded in the non-transitory computer-readable storage medium.

16. The computer program product of claim 15, further comprising a second set of instructions configured to determine whether at least one service node in the first sub-path has not been probed.

17. The computer program product of claim 16, further comprising a fourth set of instructions configured to send, in response to determining that at least one service node in the first sub-path has not been probed, one or more subsequent requests, wherein each of the subsequent requests comprises a subset of the set of unassigned flow labels, and a next target index indicating a next target node associated with the respective subsequent request.

18. The computer program product of claim 17, further comprising a fifth set of instructions configured to receive additional information from the downstream node, wherein the additional information identifies a third subset of the unassigned flow labels that are associated with a third service node among the plurality of nodes in the first path.

19. The computer program product of claim 15, wherein the set of unassigned flow labels is sent as part of a request, wherein the request further comprises a target index, the target index indicates a target node associated with the request, and the target node is a node among the plurality of nodes.

20. The computer program product of claim 19, wherein the request further comprises a network service header comprising a flow label field comprising the set of unassigned flow labels, and a target index field comprising the first target index.

* * * * *